United States Patent [19]
Kriven et al.

[11] Patent Number: 5,948,516
[45] Date of Patent: Sep. 7, 1999

[54] HIGH-STRENGTH, FLAW-TOLERANT, OXIDE CERAMIC COMPOSITE

[75] Inventors: Waltraud M. Kriven, Champaign; Dong-Hau Kuo, Urbana, both of Ill.

[73] Assignee: The Board of Trustees of the University of Illinois, Urbana, Ill.

[21] Appl. No.: 08/797,453

[22] Filed: Feb. 6, 1997

[51] Int. Cl.$^6$ ..................... B32B 17/00
[52] U.S. Cl. ............... 428/216; 428/697; 428/699; 428/701; 428/702; 428/704; 428/336
[58] Field of Search .................. 428/701, 697, 428/704, 336, 216, 702, 699

[56] References Cited

U.S. PATENT DOCUMENTS

| | | | |
|---|---|---|---|
| 4,247,249 | 1/1981 | Siemers | 415/174 |
| 5,059,095 | 10/1991 | Kushner et al. | 416/241 B |
| 5,092,948 | 3/1992 | Lange et al. | 428/902 |
| 5,137,852 | 8/1992 | Morgan et al. | 501/95 |
| 5,284,698 | 2/1994 | Marshall et al. | 428/697 |
| 5,514,474 | 5/1996 | Morgan et al. | 428/375 |
| 5,665,463 | 9/1997 | Morgan et al. | 428/699 |
| 5,687,679 | 11/1997 | Mullin et al. | 428/701 |

OTHER PUBLICATIONS

Evans, "Perspective on the Development of High–Toughness Ceramics", J. Am. Ceram. Soc., 73[2] 187–206 (1990).
Clegg, "The Fabrication and Failure of Laminar Ceramic Composites", Acta Metall. Mater., vol. 40, No. 11, pp. 3085–3093, (1992).
Kuo and Kriven, "Chemical Stability, Microstructure and Mechanical Behavior of LaP0$_4$–containing Ceramics", Materials Science & Engineering A210 (1996) 123–134.
Tsukuma and Ueda, "High–Temperature Strength and Fracture Toughness of Y$_2$O$_3$–Partically–Stabilized ZrO$_2$/AL$_2$O$_3$ Composite", J. Am. Ceram. Soc., 68 [2]C–56–C–58 (1985).
Kuo and Kriven, "Characterization of yttrium Phosphate and a Yttrium Phosphate/Yttrium Aluminate Laminate", J. Am. Ceram. Soc., 78 [11]3121–24 (1995).
Plucknett et al., "Processing of Tape–Cast Laminates Prepared from Fine Alumina/Zirconia Powders", J. Am. Ceram. Soc., 77 [8]2145–53 (1994).
Plucknett et al., "Tape Cast of Fine Alumina/Zinconia Powders for Composite Fabrication", J. Am. Ceram. Soc., 77 [8]2137–44 (1994).

*Primary Examiner*—Archene Turner
*Attorney, Agent, or Firm*—Greer, Burns & Crain, Ltd.

[57] ABSTRACT

The invention comprises a multilayer high-strength, high-toughness, flaw-tolerant oxide ceramic composite having a metal phosphate later, a first yttria stabilized zirconia layer, a yttria stabilized zirconia-alumina layer and a second yttria stabilized zirconia layer; and a method for producing the same. The metal phosphate are selected from the group consisting of monazites, xenotimes, calcium phosphate, aluminum phosphate, zirconium phosphate and substituted zirconnium phosphate wherein $Zr^{4+}$ is partially replaced by divalent metal ions. The ceramic composition of the invention may be further strengthened by the incorporation of selected particulates, whiskers or fibers, or mixture of the same, into the yttria stabilized zirconia layers, the yttria stabilized zirconia-alumina layers and the metal phosphate layers. A multilayer ceramic of the invention comprising a YPO$_4$ layer, a first yttria stabilized zirconia layer, a 30 vol % yttria stabilized zirconia-70 vol % alumina layer and a second yttria stabilized zirconia layer was found to have a 4-point flexural strength of 358, 392 MPa and an apparent work-of-fracture in the range of 8.2, 10 kJ/m$^2$.

9 Claims, 9 Drawing Sheets

HIGH-STRENGTH, FLAW-TOLERANT, OXIDE CERAMIC COMPOSITE

GOVERNMENT RIGHTS

The United States Government may have rights in this invention under United States Air Force Office of Scientific Research grant number AFOSR-F49620-93- 1-0562.

TECHNICAL FIELD

The present invention relates to ceramic composites and, in particular, to multilayer ceramic composites having a metal phosphate layer as a weak bond interface material. This weak bond interface material allows preferential interface delamination to thereby inhibit the growth of cracks across the layers of the multilayer ceramic composite.

BACKGROUND OF THE INVENTION

Ceramics have many excellent properties which make their use as structural materials very attractive. These properties include, among others, high strength, high hardness, wear resistance, high melting temperature, and excellent chemical and thermal stability. However, ceramics are also brittle, a feature which has inhibited their wide use as structural materials. While ceramic materials may be found in selected applications in electronics, air pollution control systems, catalysis and as refractories, their structural use has been limited. New ceramic materials which overcome the brittleness problem would find increased use and application in areas where they have not previously been considered.

The most promising results toward improving ceramic brittleness has been the development of continuous fiber ceramic composites (CFCC) which exhibit high strength and toughness. Examples of successful CFCCs are SiC fiber-reinforced non-oxide, glass, and glass-ceramic composites.

In order to achieve strength and toughness, these non-oxide CFCCs rely upon the presence of, for example, a C or BN film between the reinforcing fiber and the matrix (J. J. Brennan, "Interfacial Characterization of Glass and Glass-Ceramic Matrix/Nicalon SiC Fiber Composite"; Tailoring Multiphase and Composite Ceramics, R. T. Tressler et al., Eds. (Plenum, New York N.Y., 1986), pages 549–560). The role of the interfacial film is to provide weak planes which preferentially debond and slide. The preferential debonding and sliding at the interfaces of CFCCs dissipates energy by internal friction, thus inhibiting crack growth across the interface between the fibers and the ceramic matrix or, in the case of multilayer ceramics, the C or BN interlayer can enhance interface delamination. In the absence of a weak fiber/ceramic matrix interface, the fiber reinforced composites will demonstrate catastrophic fracturing under stress. However, while these non-oxide CFCCs, which contain C, BN or similar materials as an interlayer may exhibit improved toughness, they lack high temperature stability. High temperature oxidation of C, BN and other non-oxide ceramic components degrades the properties of the reinforcing material, and consequently, the properties of the ceramic composite. This limits the application of ceramic compositions containing such materials. An additional drawback to these non-oxide CFCCs is their high fabrication cost.

The search for improved ceramic materials which are not oxidation sensitive has been strongly pursued and is focused on replacing materials such as C and BN with oxide materials such as alumina or other oxides. It has been found that in addition to their oxidation resistance, these oxide materials and the ceramics which contain them have lower thermal conductivity and higher electrical resistivity properties relative to the non-oxide CFCCs. Examples of such oxide containing ceramics may be found in U.S. Pat. Nos. 5,137,852 (the '852 patent) and 5,514,474 (the '474 patent), both to Morgan et al. These patents describe the use of high strength alumina fibers coated with a monazite or xenotime phosphate ('852 patent), or β-alumina or a magnetoplumbite material (β474 patent). The high strength fibers are embedded in the ceramic matrix. The monazite, xenotime, β-alumina or magnetoplumbite coating on the fibers serves as the weak bond interphase material which provides the "planes" of slippage to relieve strain and dissipate energy by internal friction, and thus serves to inhibit crack or fracture growth. In composites containing fibers, the weak interface allows crack deflection and fiber/matrix interface debonding without rupturing the fibers. The strengthened and toughened ceramic resulting from the use of such fibers is thus preserved even though a microcrack has developed in the ceramic material. While the Morgan et al. ceramic materials exhibit improved high temperature oxidation resistivity, and represent an improvement over the C and BN containing ceramics, further improvements in the strength and toughness of ceramic materials are desired and can be achieved by the use of laminates.

Ceramic materials may have either a single matrix composition, into which reinforcing materials may be incorporated, or may be laminated or layered. Laminated ceramic composites with unique and adjustable properties can be achieved by stacking tapes having different ceramic compositions. Reinforcing particulates, fibers and whiskers can also be incorporated into the laminates by adding them to the desired layers. Tough laminated composites can be obtained by introducing ductile layers such as metallic layers, carbon fiber/epoxy layers, or weak C or BN interlayers in between the ceramic layers. For example, Clegg et al., Nature, 347;455–57 (1990) and Acta Metall., 40 [11]: 3085–93 (1992), produced a SiC containing laminate; Folsom et al., J Am. Ceramic Soc., 75 [11]: 2969–75 (1992) prepared a laminar ceramic/carbon fiber-reinforced epoxy composite; and Baskaran et al., J Am. Ceramic Soc., 76 [9]: 2217–24 (1993) and 77 [5]: 1249–55 (1994) reported on laminates containing SiC/graphite and SiC/BN. While these laminates have improved toughness, they all contain oxidizable substances and thus have limited high temperature oxidation resistance.

All-oxide composites can solve the problem of high temperature oxidation. From the experience gained in non-oxide CFCCs, fiber-reinforced composites, using oxide fibers, appear to be most promising for all-oxide composites. However, critical issues which need to be solved include producing a creep-resistant oxide fiber, finding a weak oxide interphase which behaves like graphite and boron nitride, and fabricating a dense composite. On the other hand, oxide laminates without the fiber and densification problems are easier fabricate, at a lower cost, for the oxidation-resistant applications. However, until the present invention, the brittleness of oxide laminates limited their structural applications.

It is a purpose of the present invention is to identify high strength, damage tolerant oxide ceramic composites that are formed without the use of oxidation sensitive materials and expensive fibers.

It is also the purpose of the invention to identify oxide containing ceramic laminates which have improved mechanical and thermal properties, and are formed without the use of oxidation sensitive materials or expensive fibers.

It is a further purpose of the present invention to identify high-strength, damage-tolerant oxide ceramic composites or laminates which have improved mechanical properties and which may be further strengthened by the incorporation of particulates, fibers or whiskers into selected layers of the laminate.

It is a purpose of the present invention to describe a method for preparing laminated, high-strength, damage-tolerant ceramic composites of reduced oxidation sensitivity.

SUMMARY OF THE INVENTION

The present invention comprises a multilayer oxide ceramic composite having, in a single multilayer unit, a metal phosphate layer, a plurality of yttria stabilized zirconia layers and a yttria stabilized zirconia/alumina layer. Numerous units can be "stacked", one on another, to prepare a multilayer ceramic composite having exceptional toughness and strength. In the preparation of a single multilayer unit, the yttria stabilized zirconia/alumina layer lies between two yttria stabilized zirconia layers. When multiple units are stacked together, the metal phosphate layer will lie between two yttria stabilized zirconia layers, but these yttria stabilized layers will belong to separate units. The yttria stabilized zirconia layers contain 1–5 mol % yttria.

Figure 1:
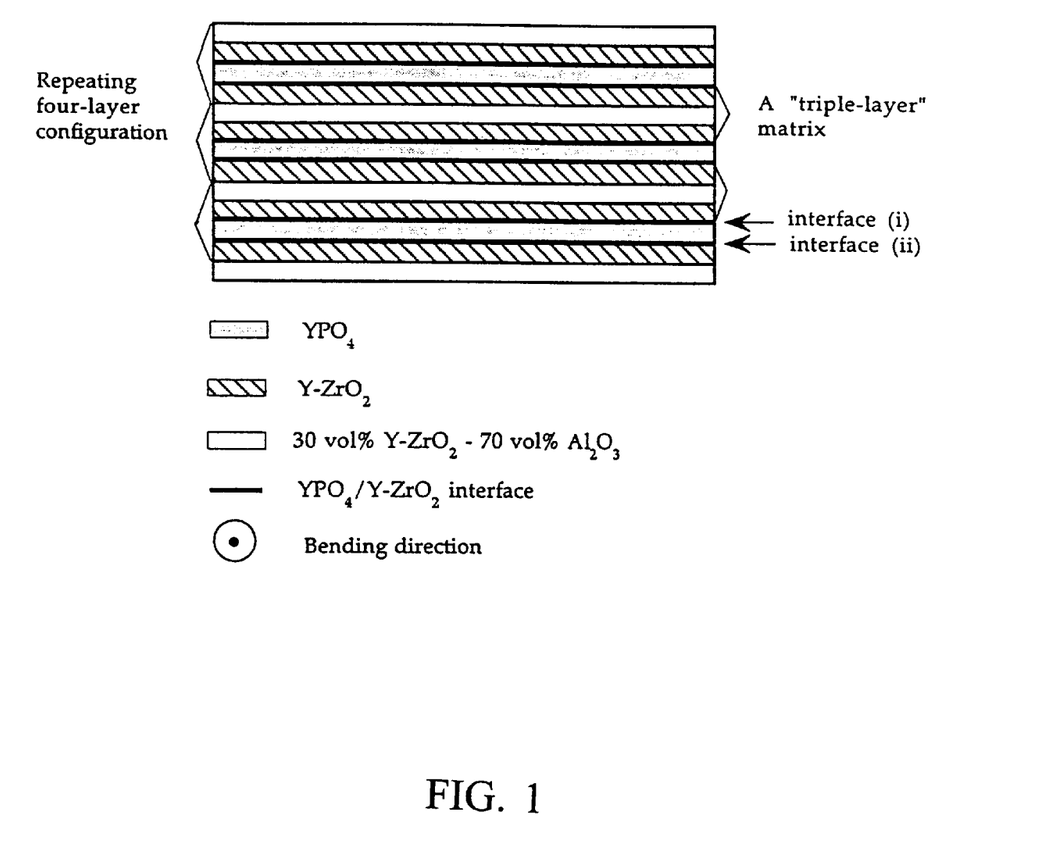
FIG. 1 is a simplified illustration of the laminate of the invention showing the repeating sequence $YPO_4$/YPSZ/YZ3A7/YPSZ.

The multilayer ceramic oxide composite of the invention contains three kinds of laminae and is stacked in a four-layer configuration as shown in FIG. 1. The oxide laminate of the invention exhibits high strength, high work-of-fracture and extended interface delamination upon stress. The excellent mechanical properties of the laminate of the invention were achieved by adjusting residual stresses via the four-layer stacking to prevent the laminate from shattering and to enhance interface delamination. The laminate of the invention as described herein can be modified by changing the lamina materials, and the mechanical properties of the system can be improved by reinforcing each lamina with particulates, whiskers and fibers.

Metal phosphates useful in practicing the invention may be selected monazites and xenotimes. Monazites ($MPO_4$) are metal phosphates containing the larger positively charged metal ions (M) from the lanthanide series (La, Ce, Pr, Nd, Pm, Eu, Gd and Tb). Xenotimes (MPO4) are metal phosphates containing the smaller positively charged metal ions of the lanthanide series (Dy, Ho, Tm, Yb and Lu).

Other metal phosphates, which possess a high melting temperature and are useful in practicing the invention, are calcium phosphate ($3CaO \cdot P_2O_5$, $T_m \sim 1730°$ C.), aluminum phosphate ($AlPO_4$, $T_m \sim 2000°$ C.) and zirconium phosphate ($2 ZrO_2 \cdot P_2O_5$, $T_m \sim 2000°$ C.). Substituted zirconium phosphates in which divalent ions such as $Ca^{2+}$ and $Sr^{2+}$ replace $Zr^{4+}$ may also be used.

High strength whiskers, particulates, platelets or fibers may be embedded in the yttria stabilized zirconia, yttria stabilized zirconia/alumina layers and the metal phosphate layers to impart further strength to the ceramic matrix.

The invention thus describes a multilayer layer ceramic oxide which utilizes a metal phosphate layer as one of three laminae, and stacks such laminae in a four layer configuration. An advantage of the invention is that it is not limited to a two layer configuration, thus broadening the feasible range of oxide laminate fabrication.

DETAILED DESCRIPTION OF THE INVENTION

The teachings of the patents and publications cited herein are incorporated by reference and are known to those skilled in the art. The term "lamina" as used herein refers to a single tape or layer in a multilayer ceramic laminate. "Laminae" refers to two or more such layers.

The preparation of YPO4 and $LaPO_4$ powders used herein has been described by Pechini in U.S. Pat. No. 3,330,697, "Method of Preparing Lead and Alkaline-Earth Titanates and Coating Method Using the Same to Form a Capacitor," and by Kuo and Kriven, "Chemical Stability, Microstructure, and Mechanical Behavior of $LaPO_4$-Containing Ceramics," *Mater. Sci. Eng.*, A210 [1–2]: 123–134 (1996). Briefly, the $YPO_4$ and $LaPO_4$ powders were prepared by dissolving 99.0% $Y_2O_3$ or $La_2O_3$ powders (Molycorp, Inc., White Plains, N.Y.) in nitric acid. Dibasic ammonium phosphate (Fisher Scientific, Pittsburgh, Pa.) was added to form a clear solution. An organic resin was formed by mixing ethylene glycol (Fisher Scientific) and citric acid monohydrate (EM Scientific, Gibbstown, N.J.). The resin was added to the metal phosphate solution in order to control the drying process and to aid in the formation of fine powders. The solution was then evaporated and dried at 200–300° C., and calcined at 950° C. Following calcination, the powders were ball milled for three days, dried and sieved through a number 100 sieve.

Chemical compatibility determinations were carried out using compressed pellets composed of $YPO_4$ or $LaPO_4$ as one component and 3 mole% yttria-partially stabilized zirconia, hereafter YPSZ, (Tosoh, USA Inc., Atlanta, Ga.) as the second component. After uniaxial pressing, the pellets were cold isostatic pressed at 86 MPa for 5 minutes. Pellet samples were then fired at 1500, 1550 and 1600° C. for three hours, and the phases were identified using X-ray diffractometry (XRD, Model Dmax, Rigaku/USA, Inc., Danvers, Mass.). Microstructural characterization was performed by optical microscopy and scanning electron microscopy (SEM, Model DS - 130, International Scientific Instruments, Santa Clara, Calif.). The YPSZ and the 99.8% $Al_2O_3$ powder (A16-SG, Alcoa Aluminum Co., Pittsburgh, Pa.) also used herein were used as received. YPSZ containing 1–10 mol % yttrtia may be used in practicing the invention.

The general procedure for making laminate composites by tape casting have been described by Kuo and Kriven, ibid. Commercially available plastic or polymeric sheets, for example, Mylar® and similar sheets, were used as a backing in the tape casting procedure. Material properties can be controlled by adjusting the tape compositions, reinforcement orientation and stacking sequence. The three types of tapes which were fabricated and used in practicing the invention are a $YPO_4$ tape, a yttria partially-stabilized zirconia tape (YPSZ), and a 30 vol % YPSZ-70 vol % $Al_2O_3$ tape (YZ3A7). A slurry of each of the above materials was prepared by standard techniques known to those skilled in the art. Typically, the slurry contained approximately 20 vol % oxide powder and approximately 60 vol % solvent consisting of a mixture of trichloroethylene and ethanol, the remaining 20 vol % being a combination of a dispersant, a binder and plasticizers. Slurries were tape cast to yield laminae of 100–200 $\mu$m thickness with a doctor blade opening of 250–350 $\mu$m. Eighty-layer laminate composites were fabricated by periodically stacking two or three types of oxide laminae having dimensions of 25×51 mm. Thermocompression was performed by holding the stacked laminae at 50–80° C. under 10 MPa pressure for 1 hour. The organic additives were removed by heating to 650° C. at a rate in the range 2–5 ° C./hr, preferably at 3 ° C./hr, followed by about a 3-hr holding time at 650° C. and subsequent cooling to ambient temperature, 18–35° C. Subsequently, the bulk materials were isostatically cold pressed at approximately 170 MPa for 10 minutes and then loaded into a graphite die with YPSZ surrounding the pressed laminates. Consolidation of the laminate was carried out by hot pressing, under an argon atmosphere, at 28 MPa and a temperature of about 1550° C. for about 2 hours. After hot pressing, the laminate was annealed at 1000° C. for 6 hours.

It is within the scope of the invention that the nominal percentage composition of the following various layers or the substance used in preparing the laminates of the examples given herein may very within the ranges given. As used herein, the term "about" will signify such ranges.

YPSZ may contain 2–5 mol % yttria.

YZ3A7 may contain 10–40 vol % yttria stabilized zirconia and 90–60 vol % alumina.

(YCeSr) Z7A3 and (YCeSr) Z7Mu3 may contain 65–75 vol % $ZrO_2$/25–35 vol % $Al_2O_3$ or 65–75 vol % $ZrO_2$/25–35 vol % mullite with 1–3 mol % $Y_2O_3$ and 2–5 mol % $CeO_2$ based on $ZrO_2$ and 8–11 mol % SrO based on $Al_2O_3$.

YP7YPSZ3 may contain 65–75 vol % $YPO_4$ and 25–35 vol % YPSZ.

In general, where a nominal value is given for any component or composition and a range is not specified, one may assume that the nominal value may vary by ±15% of the value given. For example, if the specification states that a layer contains 30 vol % monazite phosphate, it is within the scope of the invention to use 25.5–34.5 vol % monazite phosphate unless a specific range is given. As used herein, the term "about" will signify such variation.

The alumina used herein in the preparation of the various tapes may be alpha, gamma, Bayerite and similar aluminas. Alpha alumina is preferred because of its stability at high temperatures. Various aluminas may be converted to alpha alumina by methods known in the art.

A single "unit" in the multilayer laminates according to the invention comprises four layers consisting of a $YPO_4$ layer, a first YPSZ layer, a YZ3A7 layer and a second YPSZ layer, the layers being laid down in the sequence given. For example, to prepare a multilayer laminate, the Mylar® sheets are first removed from all the types of dried tapes. The different types of laminae are then stacked in the sequence $YPO_4 \rightarrow YPSZ \rightarrow YZ3A7 \rightarrow YPSZ$ until the desired thickness or number of layers is reached. The illustrations given herein represent an 80-layer laminate prepared by a 20-fold repetition of the above sequence. Other methods of preparing laminates, which are known to those skilled in the art, may also be used. FIG. 1 is a simplified illustration of the invention showing the repeating sequence $YPO_4$/YPSZ/YZ3A7/YPSZ. It is within the scope of the invention that a multilayer laminate can have individual lamina of varying thickness, for example, in the range of 1–500 $\mu$m.

In addition to preparing laminates as described, reinforcing particulates, fibers and whiskers can be added to the YPSZ layers, YZ3A7 layers and the metal phosphate layers to further strengthen the laminates. If oxidation and high temperature conditions are not going to be encountered, BN, SiC, $Si_3N_4$ and similar non-oxide reinforcing materials may be used. If the laminate is to be operated under oxidizing and/or high temperature conditions, reinforcing materials such as alumina whiskers and similar oxidation and/or high temperature resistant materials are preferred.

The mechanical and microstructural evaluation of the laminates according to the invention was performed on annealed, hot-pressed laminates which were cut into bars of size 25 mm×2–2.5 mm×2–2.5 mm. A bar was ground and polished to a 1 $\mu$m finish with diamond pastes. The edge of the bar was chamfered with 15 $\mu$m diamond paste. Four-point flexural testing was performed using a 10 mm inner span and a 20 mm outer span at a crosshead speed of 0.05 mm/min. in a screw-driven machine (Model 4502, Instron Corp., Canton, Mass.). The tensile surface was normal to the hot-pressing direction. Apparent work-of-fracture was obtained by dividing the area under the load-displacement curve by the cross-sectional area of the sample as taught by Tattersall and Tappin, "The Work of Fracture and its Measurement in Metals, Ceramics and other Materials," *J Mater. Sci.* 1: 296–301 (1966). Radial cracks were generated under a 10 kg indentation load in order to study crack propagation profiles and interaction with the microstructure. Microstructural characterization was performed by optical microscopy and scanning electron microscopy (SEM, Model DS-130, International Scientific Instruments, Santa Clara, Calif.).

Eight types of $YPO_4$-and $LaPO_4$-containing $ZrO_2$ laminates (Table 1) were fabricated and tested. The YPO$_4$/YPSZ/YZ3A7/YPO$_4$ laminate of the invention is designated Y(a). The (YCeSr)Z7A3 and (YCeSr)Z7Mu3 layers in the laminates listed in Table 1 were composed of 70 vol % $ZrO_2$/30 vol % $Al_2O_3$ or 70 vol % $ZrO_2$/30 vol % mullite (Kyoritsu Ceramic Materials Co., Nagoya, Japan; $3Al_2O_3 \cdot 2SiO_2$) with 2 mol % $Y_2O_3$ and 4 mol % $CeO_2$ based on $ZrO_2$ and 9.1 mol % SrO based on $Al_2O_3$ (the molar ratio of SrO/Al O $_2is_3$ approximately 1). The additives in these layers are present in consideration of the humidity sensitivity of $ZrO_2$ and for strengthening the same. The composites ($(4Y,4Ce)$—$ZrO_2$/$Al_2O_3$), fabricated by using wet chemical methods, have shown a high degree of resistance to the tetragonal-to-monoclinic (t→m) phase transformation during lower temperature ageing as explained by Hirano et al., "Fabrication and Properties of Yttria- and Ceria-doped Tetragonal Zirconia/Alumina Composites", *Br. Ceram. Trans. J*, 90: 48–51 (1990). Simultaneous additions of SrO and $Al_2O_3$ to $ZrO_2$ can lead to the in situ formation of strontium aluminate platelets. This type of zirconia can have high strength and hardness without loss of toughness.

TABLE 1

YPO₄ and LaPO₄ Containing Zirconia Laminates

| Laminate Designation | Laminate Sequence |
| --- | --- |
| YPO₄ Laminates | |
| Y(a) | YPO₄/YPSZ/YZ3A7/YPO₄ |
| Y(b) | YP7YPSZ3/(YCeSr)Z7A3 |
| Y(c) | YP7YPSZ3/(YCeSr)Z7A3/A/YP7YPSZ3 |
| Y(d) | YPO₄/YPSZ |
| LaPO₄ Laminates | |
| L(a) | LaPO₄/YPSZ |
| L(b) | LaPO₄/(YCeSr)Z7A3 |
| L(c) | LaPO₄/(YCeSr)Z7Mu3/A/(YCeSr)Z7Mu3 |
| L(d) | LaPO₄/YPSZ/Z3A7/YPSZ |

Notes:
1. Mu is mullite.
2. YPSZ is yttria partially-stabilized zirconia containing 3 mol % yttria.
3. A is alumina (only).
4. YZ3A7 is 30 vol % yttria partially-stabilized zirconia, 70 vol % alumina. The yttria partially-stabilized zirconia is as described above in Note 2.
5. (YCeSr)Z7A3 is 70 vol % zirconia and 30 vol % alumina containing 2 mol % $Y_2O_3$ and 4 mol % $CeO_2$ based on zirconia, and 9.1 mol % $ZrO_2$ based on alumina.
6. (YCeSr)Z7Mu3 is 70 vol % zirconia and 30 vol % mullite containing 2 mol % $Y_2O_3$ and 4 mol % $CeO_2$ based on zirconia, and 9.1 mol % $ZrO_2$ based on mullite.
7. Z3A7 is 30 vol % zirconia and 70 vol % alumina.
8. YP7YPSZ3 is 70 vol % YPO₄ and 30 vol % YPSZ.
9. Layer separation is indicated by the diagonal line.

Figure 2:
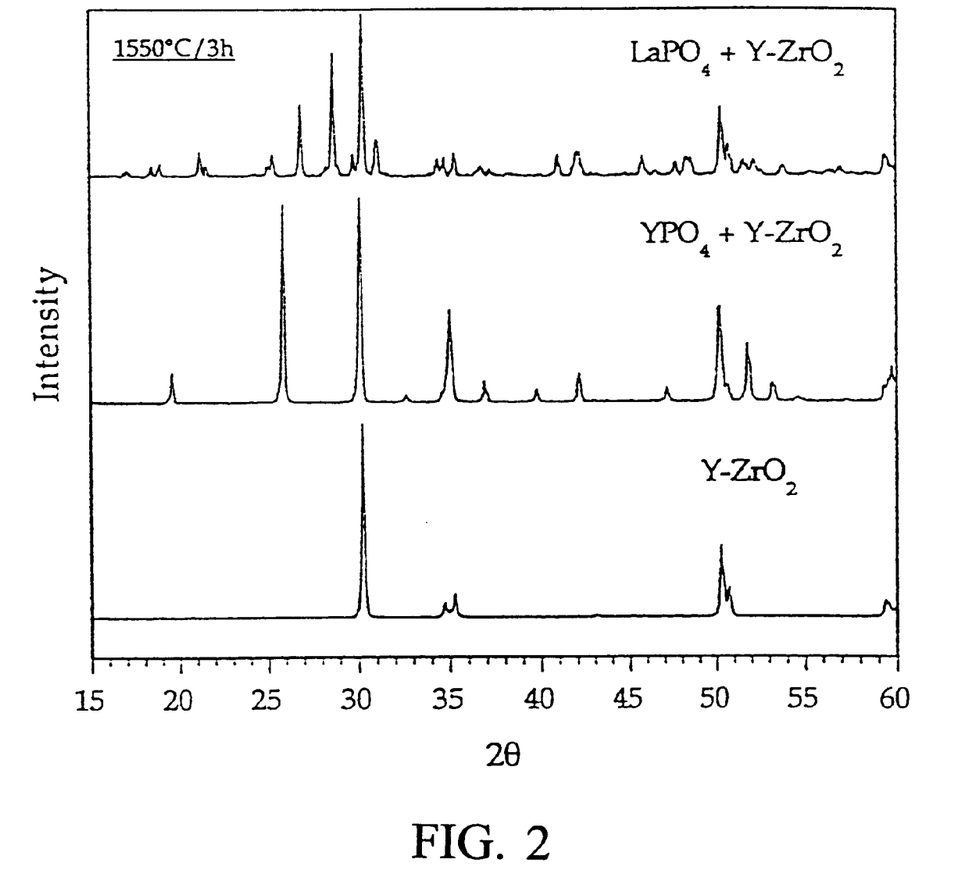
FIG. 2 is an X-ray diffraction comparison of (a) $YPO_4$/YPSZ and (b) $LaPO_4$/YPSZ pellets after firing at 1550 ° C. for 3 hours.

Chemical compatibility studies between YPO₄ and YPSZ, and between LaPO₄ and YPSZ were carried out by firing pellets composed of layers of these materials at temperatures of 1500, 1550 and 1600° C. for 3 hours. The XRD results were the same for all pellet firings and indicate that there was no formation of reaction compounds between the various layers. The YPSZ phase remained tetragonal. The results for the 1550° C. firing are shown in FIG. 2.

Figure 3:
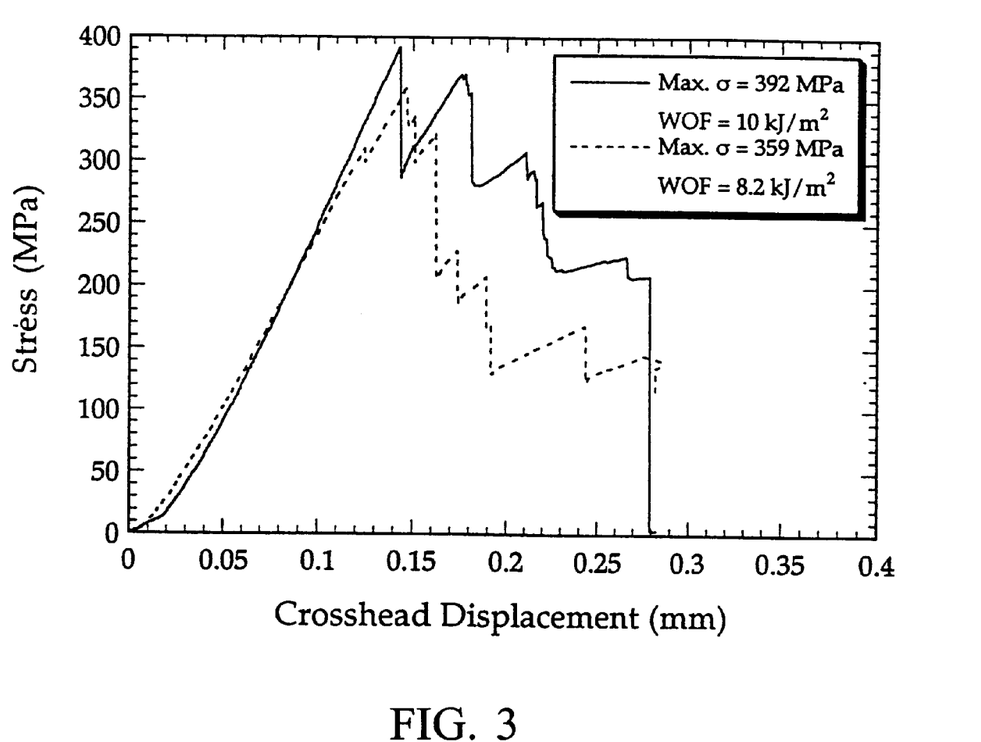
FIG. 3 illustrates load vs displacement curves of a $YPO_4$/YPSZ/30 vol % YPSZ-70 vol % $Al2O_3$/YPSZ laminate tested in 4-point flexure.
Figure 4:
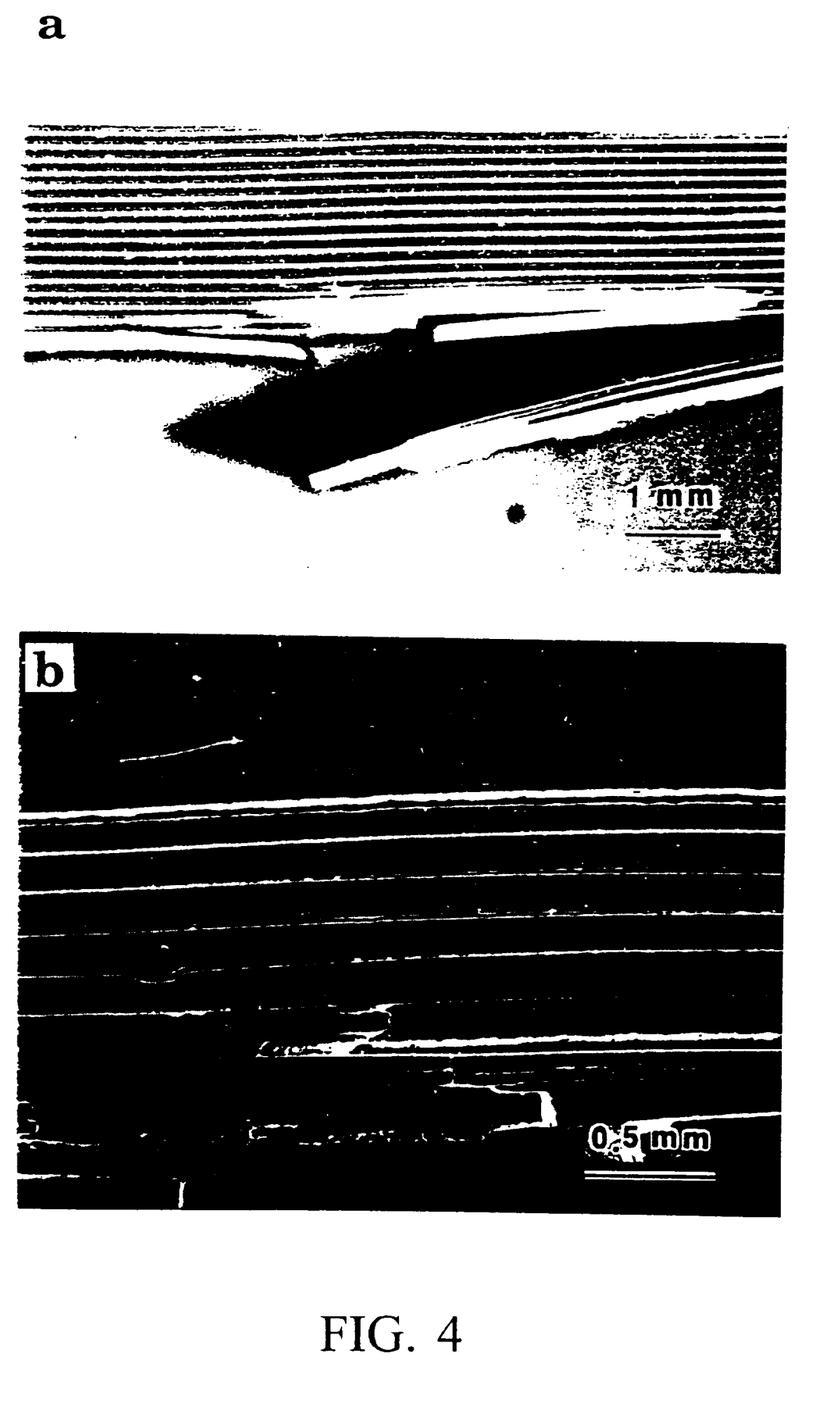
FIGS. 4A and 4B are optical and SEM micrographs, respectively, illustrating the side surfaces of a $YPO_4$/YPSZ/30 vol % YPSZ-70 vol % Al2O3/YPSZ laminate after 4-point flexural testing.

Flexural testing was utilized to evaluate the performance of the laminate of the invention and other laminates. FIG. 3 illustrates two load-displacement responses of the YPO₄/YPSZ/YZ3A7/YPSZ laminate (Table 1, Y(a)) which had an ultimate 4-point strength of 358 MPa and 392 MPa, respectively. The step-wise load drops, beyond the peak stress, are characteristic of a non-brittle fracture. Before a bend bar broke, the flexural test was stopped and the fractural behavior was examined by optical and SEM microscopy with the results as shown in FIGS. 4A and 4B, respectively. The optical micrograph displays a low-magnification view of the test bar. The SEM micrograph reveals the detailed nature of the fracture. The tensile (bottom) portion of the laminate shows pronounced interfacial delamination while the compressive (upper) portion remained intact (FIG. 4B). The delaminated interfaces are found only between YPO₄ and YPSZ. The interfaces between YPSZ and YZ3A7 remained strongly bonded and without interfacial delamination. The apparent work-of-fracture values were determined to be about 8.2 and 10 kJ/m², respectively, after two tests.

Figure 5:
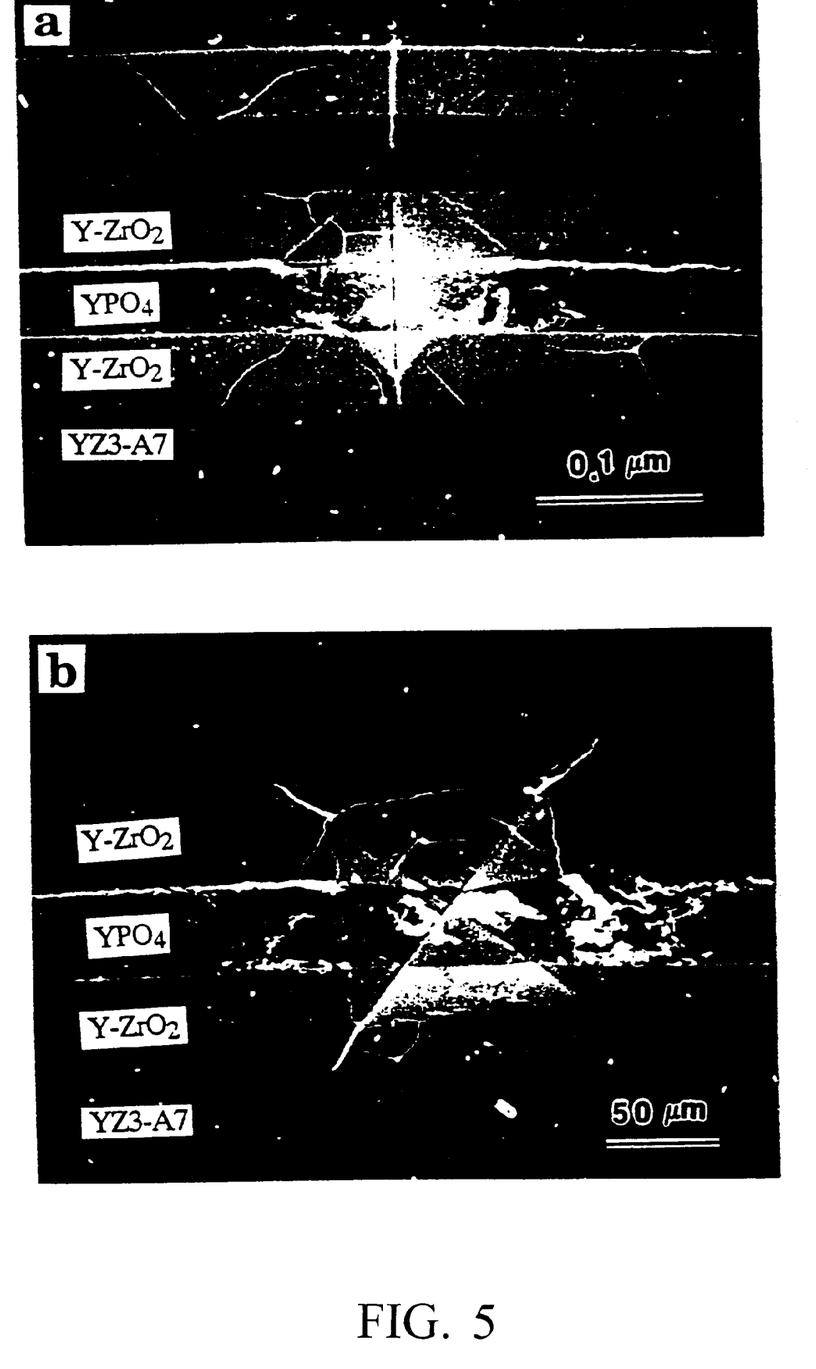
Figs. 5A and 5B are SEM micrographs illustrating the indentation crack patterns in a $YPO_4$/YPSZ/30 vol % YPSZ-70 vol % $Al_2O_3$/YPSZ laminate where the indents were oriented at 0°/90° (5A) and 45° (5B) relative to the layer length direction.

In order to examine the interaction between cracks and the laminated microstructure, Vickers indentation cracks were introduced into the oxide laminate of the invention at an orientation of 0°/90° (FIG. 5A) and at 45° (FIG. 5B) relative to the layer length direction. The radial cracks were preferably generated from the Vickers indent. Indent-induced cracks displayed a preferred propagation path along the YPO₄/YPSZ interface rather than along the YPSZ/YZ3A7 interface. This behavior is clearly illustrated by the 45° indent of FIG. 5B. The 45° indent produced radial cracks and cracks along the weak YPO₄/YZ3A7 interface. This is consistent with what is illustrated by the flexural test results.

The oxide laminate of the invention possesses high strength and toughness, and exhibits graceful failure instead of catastrophic shattering under bending tests. To attain such properties, it is necessary for the YPO₄ layer to lie between the YPSZ/YZ3A7/YPSZ sequence of layers. A laminate comprised only of a plurality of YPO₄ and YPSZ layers, Y(d), shattered due to a large coefficient of thermal expansion ($\alpha$) mismatch between YPO₄ ($\alpha=8.6 \times 10^{-6}/°$ C.) and YPSZ ($\alpha=\text{ca.}10.6 \times 10^{-6}/°$ C.). Although the YZ3A7 layer has a coefficient of thermal expansion of about $9.3 \times 10^{-6}/°$ C., it does not provide a weak interface. The YZ3A7 layer functions to increase the stiffness of the laminate and modify the residual stresses in the oxide laminate of the invention, thereby enabling fabrication of the novel oxide laminate Y(a).

By comparing a YPO₄/YPSZ laminate, Y(d), with the laminate of the invention, Y(a), one can determine two reasons for the laminate of the invention achieving interfacial delamination before the interlayers broke. The first is the weak nature of the YPO₄/YPSZ interface as observed in FIG. 4B. The second is stress-assisted delamination. Both factors are important in creating strong, damage-tolerant oxide laminates.

Figure 6:
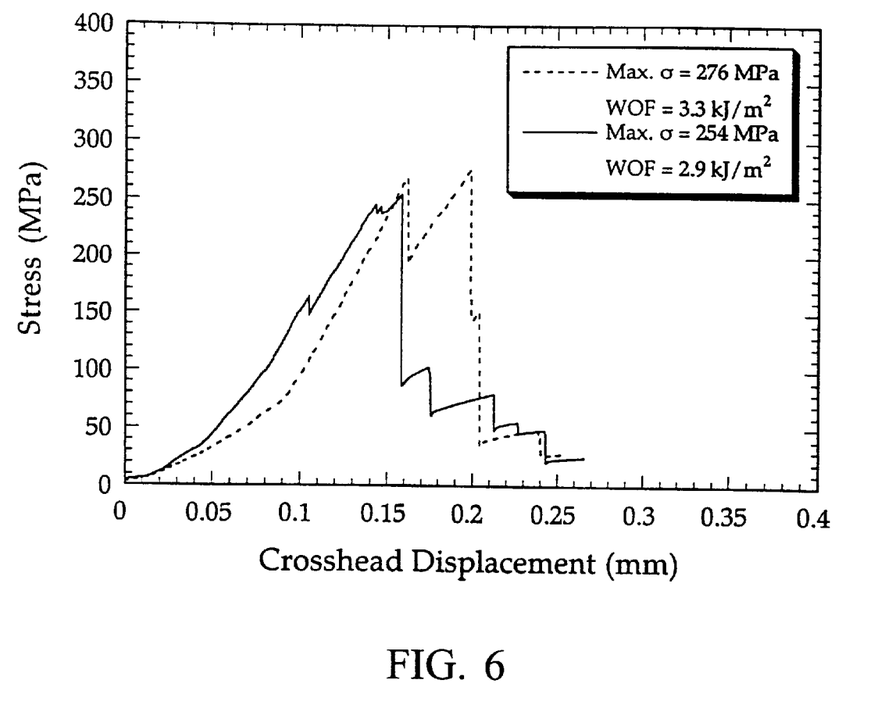
FIG. 6 illustrates the load vs. displacement curves of a $LaPO_4$/70 vol % (YCeSr)$ZrO_2$-30 vol % alumina laminate tested in 4-point flexure.
Figure 7:
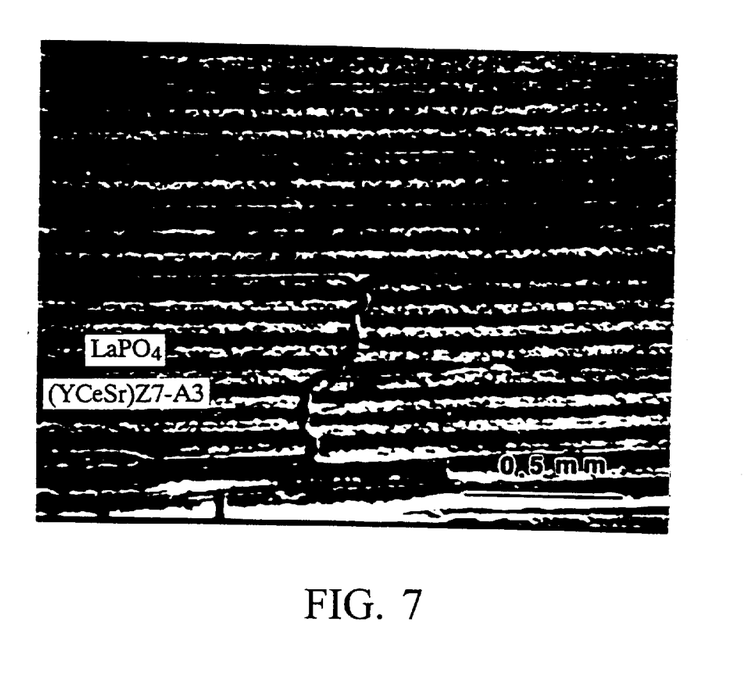
FIG. 7 is a SEM micrograph illustrating the side surfaces of a $LaPO_4$/70 vol % (YCeSr)$ZrO_2$-30 vol % alumina laminate tested in 4-point flexure.

A laminate which exhibited moderately high strength and damage tolerance is the LaPO₄/(YCeSr)Z7A3 laminate designated L(b). FIG. 6 illustrates two load-displacement responses of this laminate under 4-point flexural testing. The ultimate strengths are 276 and 254 MPa with work-of-fracture values of 3.3 and 2.9 kJ/m². This laminate has a zirconia layer modified by alumina. This modification decreases the thermal mismatch between the layers. The work-of-fracture valve for L(b) is lower than that of Y(a). A LaPO₄/YPSZ laminate, L(a), was also fabricated, but disintegrated during bend bar cutting. FIG. 7 is a SEM micrograph of the 4-point flexural response of the L(b) laminate. Interfacial delamination occurs to prevent catastrophic fracture.

Figure 8:
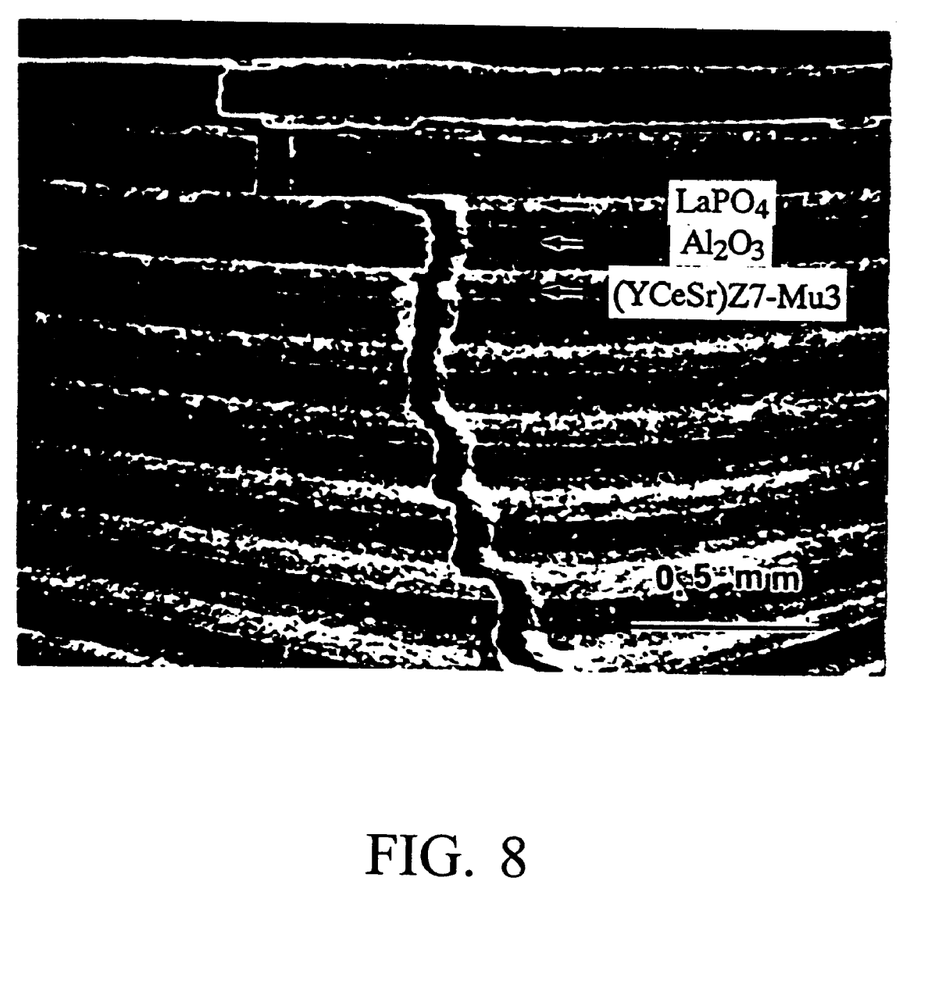
FIG. 8 is a SEM micrograph illustrating the side surfaces of a $LaPO_4$/70 vol % (YCeSr)$ZrO_2$-30 vol % mullite/$Al_2O_3$/70 vol % (YCeSr)$ZrO_2$-30 vol % mullite laminate after 4-point flexural testing.
Figure 9:
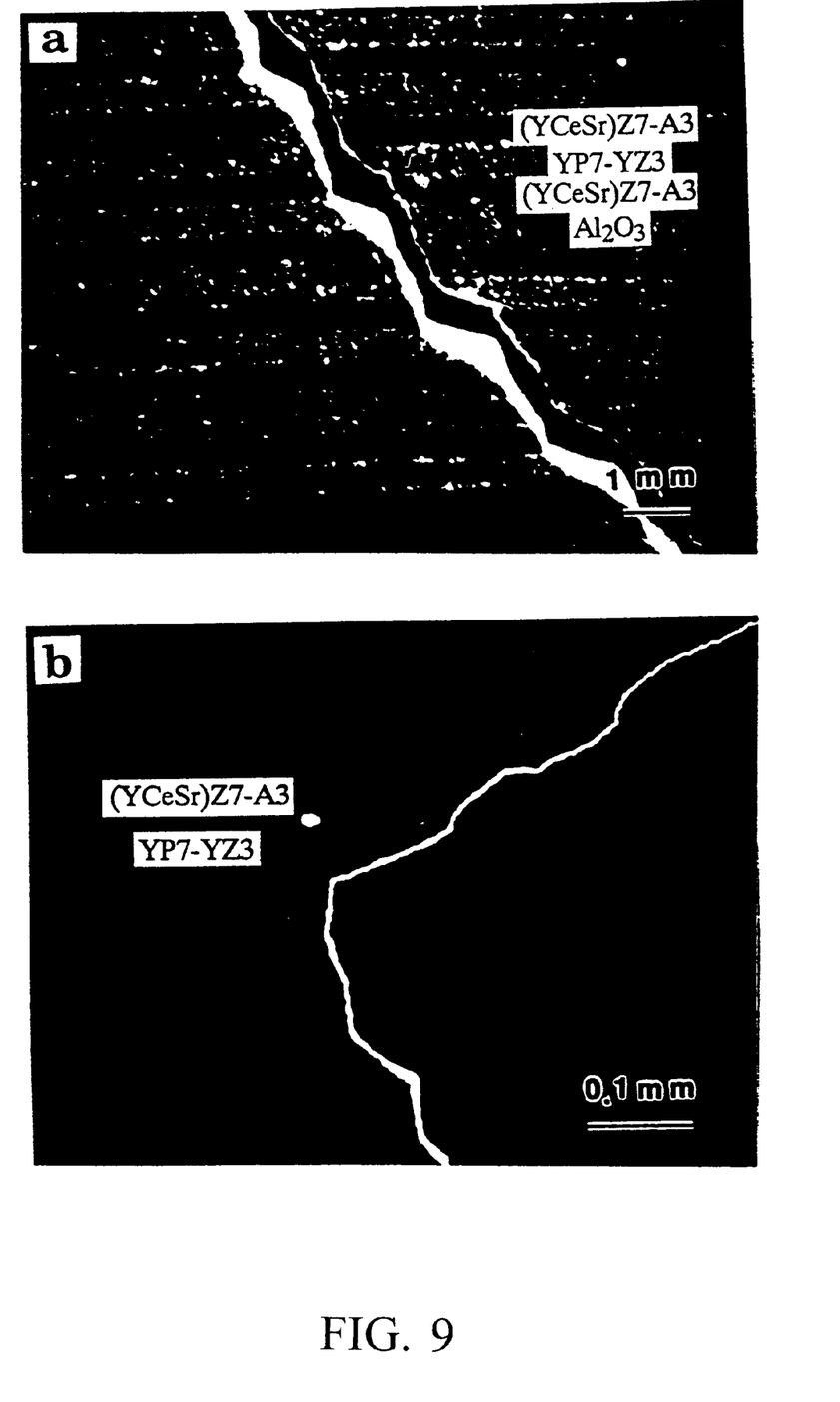
FIGS. 9A and 9B are SEM micrographs illustrating the Y(b) and Y(c) laminates of Table 1 after 4-point flexural testing.

Not all the YPO4-and LaPO₄—ZrO₂ laminates displayed moderate or high strength and damage tolerance. For example, the L(c) laminate had low flexural strength measurements of 124 and 91 MPa and low work-of-fracture values of 1.2 and 1.0 kJ/m². FIG. 8 is the SEM micrograph of L(c) after 4-point flexure testing. The Y(b) laminate gave flexural strength values of 187 and 163 MPa, and displayed brittle fracturing. The Y(c) laminate had a flexural strength of 217 MPa and catastrophically failed under 4-point testing. The SEM micrographs of Y(c) and Y(b) are shown in FIGS. 9A and 9B, respectively.

Some laminates could not be successfully fabricated. The Y(d) and L(d) laminates shattered after removal from the hot press die. The L(a) laminate remained intact after removal from the hot press die, but shattered during bend bar cutting. Table 2 summarizes the properties of the laminate of the invention and the various other laminates which were studied. For comparison purposes, Table 3 lists the work-offracture values for various types of common materials. The laminate of the invention falls between teak wood and brass, whereas all the other laminates either fall below toughened polystyrene and cast iron, or did not survive hot pressing and consequently could not be tested.

TABLE 2

Properties of Various Laminates

| Laminate | Strength/Damage Tolerance | 4-Point Strength[1] | Work-of-Fracture[2] |
|---|---|---|---|
| Y(a) | good/good | 358, 392 | 8.2, 10 |
| Y(b) | medium/bad | 187, 163 | N/A, fail |
| Y(c) | medium/bad | 217 | N/A, fail |
| Y(d) | N/A | Shattered coming out of die. | |
| L(a) | N/A | Shattered during cutting. | |
| L(b) | medium/medium | 276, 254 | 3.3, 2.9 |
| L(c) | low/low | 124, 91 | 1.2, 1.0 |
| L(d) | N/A | Shattered coming out of die. | |

Notes:
1 = 4-point flexural testing in MPa.
2 = work-of fracture in kJ/m².

TABLE 3

Work-of-Fracture Values for Various Common Materials

| Material | Work-of-Fracture (kJ/m² |
|---|---|
| Dural | 140 |
| Copper | 50 |
| Key steel | 50 |
| Brass | 30 |
| Laminate of the Invention | 8–10 |
| Teak wood | 6 |
| Cast iron | 4 |
| Toughened polystyrene | 4 |
| Deal wood | 2 |
| Cellulose | 2 |
| Polystyrene | 1 |
| Reactor graphite | 0.1 |
| Firebrick | 0.02–0.07 |
| Alumina | 0.04 |

The Y(a) laminate of the invention has mechanical properties comparable to those of well-known, high strength, non-oxide composites such as those containing SiC and/or BN, and has properties which are greatly improved over previously known oxide composites, including the "wood-like" composites incorporating oxide fibers or "logs" as illustrated by the '474 and '852 patents. Clegg et al, *Nature*, 347: 455–57 (1990) and *Acta Metall.*, 40 [11]: 3085–93 (1992), produced a laminar fabric of SiC interleaved with graphite films which has flexural stress-strain behavior comparable to fiber-reinforces composites. The 3-point flexural strength was as high as 633 MPa with a work-of-fracture, calculated by the method used herein, in the range 4.6–6.7 kJ/m². However, while possessing high strength, the Clegg fabric would not be useful in a high temperature oxidizing environment. Folsom et al, *J. Am. Ceramic. Soc.*, 75 [11]: 2969–75 (1992), prepared a laminar ceramic/carbon fiber-reinforced epoxy composite with a 4-point flexural strength of 400 MPa and graceful failure. Baskaran et al, *J. Am. Ceramic Soc.*, 76 [9]: 2217–24 (1993) and 77 [5]: 1249–55 (1994), reported fibrous monolithic ceramics which exhibited a 4-point flexural strength of about 250 MPa for a SiC/graphite system and 300–375 MPa for a SiC/BN system, with graceful failure. The apparent work-of-fracture for the fibrous monolithic systems was 1.3 kJ/m² and 2.4 kJ/m² for SiC/graphite and SiC/BN, respectively. In comparison to the ceramic material of the prior art as discussed above, the oxide laminate of the invention had a 4-point flexural strength of 358, 392 MPa, and an apparent work-of-fracture of greater than 8.2, 10.0 kJ/m², after two tests.

The non-catastrophic fracture under high fractural load on an un-notched bar is important in ceramics. To obtain a controlled failure in a conventional ceramic, it is necessary to use a specimen with a deep notch cut into the tensile surface so that the total stored energy at failure is smaller than the total energy required for fracture. It is not necessary to notch a ceramic to obtain a non-catastrophic failure if the work-of-fracture of the material is high.

During loading, the Y(a) laminate delaminated to partially dissipate the strain energy (accumulated from the applied load and residual strain energy) by creating free surfaces. After interfacial delamination, the load was redistributed and supported by the debonded YPSZ/YZ3A7/YPSZ/YPO$_4$ layers and the unbroken part. At this stage, ZrO$_2$-containing layers played an important role. These strong layers could support the applied load, which kept the delaminated oxide laminate from fracturing catastrophically. As the cracking/delamination events continued, a non-brittle response was achieved. After going through several cracking/delamination events, the bar was severely bent. At the same time, the first delaminated interface (the mid-plane) was severely damaged as shown in FIG. 4(B). This fracture behavior is similar to that occurring in fiber-reinforced ceramic composites having a weak interface. That is, interfacial debonding and delamination are followed by load redistribution among the unfractured part and the unbroken fibers.

In view of the above observations, it is believed that severe interfacial delamination is an important mechanism for achieving flaw-tolerant ceramics, one which can improve the brittleness of ceramics. It is a more effective toughening mechanism than those of crack deflection, crack branching and microcracking, which operate in most particulate and whisker-reinforced ceramic composites. This mechanism is not preferred for polymer and metal composites, where strength is the main concern.

A Y(a) laminate according to the invention, repeatedly stacked in a four-layer configuration, has been shown by the results presented herein to have both high strength and high apparent work-of-fracture value. By alternating a strong three-layer YPSZ/ YZ3A7/YPSZ segment with a YPO$_4$ layer, a matrix is formed that provides the required strength and creates the weak interface between YPO$_4$ and the three-layer segment that provides for the delamination and prevents catastrophic failure. The four layer configuration of the invention is illustrated in FIG. 1. In contrast to Y(a), the YPO$_4$/YPSZ laminate, Y(d), shattered due to a large thermal coefficient mismatch between YPO$_4$ as previously stated.

The delamination that occurred in the Y(a) laminate is caused by residual interlaminar shear stress-enhanced failure. Because of high debond shear strength (ca. 80–100 MPa) in the known oxide interfaces, it is difficult for delamination to occur in oxide laminates. Most ceramics flexure catastrophically if tested for flexural strength by the ASTM C 1161–94 method. The relationship between the maximum tensile stress ($\sigma_{max}$) and the maximum shear stress ($\tau_{max}$) under 4-point flexural testing is expressed as $\tau_{max})(\sigma_{max}=h/L$, where L is the distance of the outer span and h is the specimen thickness. To activate the shear failure at the condition of $\tau_{max}$=100 MPa for the specimen dimensions of this invention, the flexural strength of the test bar needs to be higher than ca. 900 MPa. This high strength was not possessed by the Y(a) laminate (<400 MPa, as listed in Table 2). However, after a comparison with the Y(d) laminate, which has only YPO$_4$ and YPSZ layers, the driving force of interfacial delamination is postulated to be the residual interlaminar shear stress. While the residual interlaminar shear stress is required to enhance delamination, the Y(d) laminate runs a severe risk of shattering, as indeed it did coming out of the hot press, due to the large thermal coefficient of expansion differences of the layers. This thermal coefficient shattering is avoided in the invention by the addition of the YZ3A7 layer to form a four-layer configuration.

Figure 10:
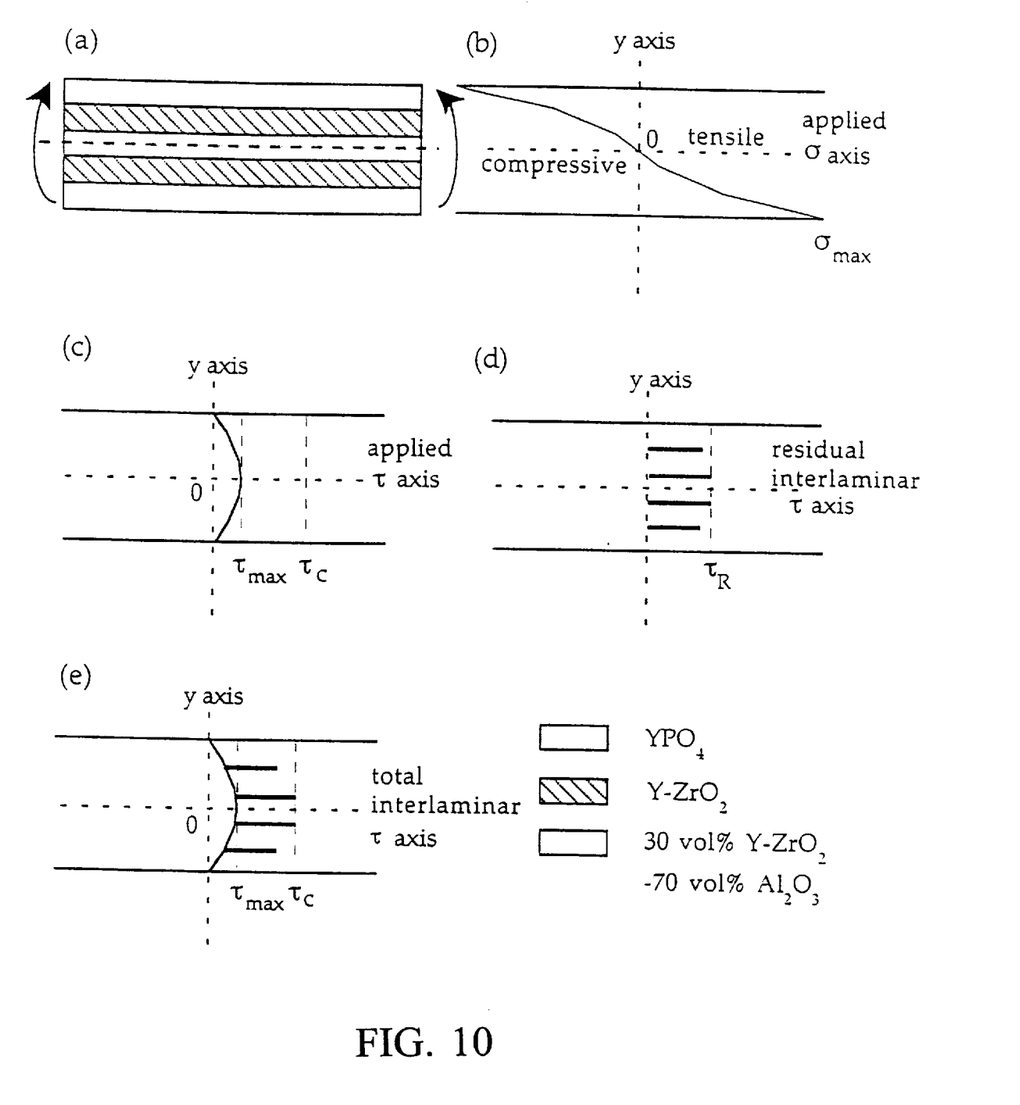
FIGS. 10(a)-10(e) illustrate the residual interlaminar shear-enhanced initiation mechanism for interfacial delamination which occurs in the $YPO_4$/YPSZ/YZ3A7/YPSZ laminate of the invention; (a) representing a simplified laminate, (b) illustrating applied normal stress distribution, (c) illustrating applied shear stress distribution, (d) illustrating the pre-existing residual stress located at the weak interfaces, and (e) illustrating the superposition of the applied and residual shear forces.

The initiation of interfacial delamination of the Y(a) laminate under flexural testing using an un-notched bar is schematically shown in FIG. 10. The distribution of normal and shear stresses through the thickness of a simplified laminate was qualitatively calculated using Young's moduli of 152, 200 and 380 MPa for YPO$_4$, YPSZ and Al$_2$O$_3$, respectively. The calculation was based on the Bernoulli-Euler theory of elementary mechanics of materials. The interfacial delamination that occurred in the Y(a) laminate is caused by shear failure. As the critical interfacial debonding shear stress, $\tau_c$, is reached, the interface will delaminate. If there is no residual stress, the applied stress, $\sigma_a$, produces a maximum tensile stress, $\sigma_{max}$, at the mid-plane during flexural testing. The observed $\tau_{max}$ is less than $\tau_c$ and no interfacial delamination occurs. If there is a pre-existing residual shear stress, $\tau_R$, and the sum of $\tau_{max}$ and $\tau_R$ is equal to $\tau_c$ (FIG. 10(e), interfacial delamination at the middle plane is initiated. At this point, $\sigma_{max}$ is less than the fracture stress, $\sigma^*$, of the test bar, which facilitates delamination propagation at the debond interface. If $\sigma_{max}$ reaches $\sigma^*$ before interfacial delamination occurs, the laminate will fracture in a brittle fashion. Therefore, the initiation of interfacial delamination at the mid-plane can occur if $$\tau_{max}+\tau_R=\tau_c, \text{ and } \sigma_{max}<\sigma^*.$$

After interfacial delamination occurs close to mid-plane, the applied stress is redistributed and the bar behaves pliantly. Interfacial delamination after initiation occurs predominately at the tensile (bottom) half of the bar which was previously under tensile loading. This situation was clearly observed in FIG. 4 where the first delaminated interface near the mid-plane was severely damaged. There are three approaches to facilitating interface delamination:

1. High laminate strength: high interlaminar shear stress ($\tau_{max}$) concurrent with high applied stress is needed to initiate interfacial delamination;
2. Low critical interfacial debonding shear stress ($\tau_c$); and
3. Adequate residual interlaminar shear stress ($\tau_R$): low $\tau_R$ is not sufficient to initiate the shear failure mechanism and high $\tau_R$ will damage the laminate.

Based on the data provided by the Y(a) laminate of the invention, the strength of different layers of the composite may be increased by changing the composition of such layers. For example, yttria stabilized zirconia/20 wt % alumina with strength as high as 2.5 GPA could replace YPSZ to enhance the strength of the laminate. A two-phase YPO$_4$-containing composite could replace YPO$_4$ as used in the invention to enhance the mechanical properties of the laminate. The high temperature properties of the laminate of the invention can be reinforced by the incorporation into the laminate of creep resistant materials such as whiskers, fibers and particulates. These fibers, whiskers or particulates can be in any layer, and may include Al$_2$O$_3$, Y$_3$Al$_5$O$_{12}$, BeAl$_2$O$_4$, MgAl$_2$O$_4$, ZrO$_2$, SiC, BN, SiN, mullite, cordierite and similar materials, and mixtures of the same.

Laminate design is important to attaining a successful high-strength, flaw-tolerant laminate composite. Some oxide laminates having the four-layer configuration do not have properties as good as those of the Y(a) laminate. For example, in the Y(c) laminate, the insufficient residual stress and the lower strength of Al$_2$O$_3$ led to lower $\tau_{max}$, thus causing the Y(c) laminate to have lower strength and fracture catastrophically. The L(c) system was degraded by the weaker LaPO$_4$ layers under residual stress and the lower strength of Al$_2$O$_3$. The L(d) system was shattered by the large thermal expansion mismatch between LaPO$_4$ and YPSZ, and the weaker laminae containing unstabilized ZrO$_2$. In a successful design strategy for a strong and non-brittle oxide laminate, it is necessary to enhance lamina strength by incorporating reinforcements, and by modifying the residual stresses by reinforcing the laminae and adjusting lamina composition.

The examples and teachings which have been given herein are for the purpose of illustrating the invention and are not to be taken as limiting the invention. The examples demonstrate that strong and non-brittle oxide laminates can be prepared without the use of oxidation-sensitive materials such as C, BN and SiC. A laminate according to the invention, Y(a), exhibits high strength and work-of-fracture values resulting from interfacial delamination due to the presence of the YPO$_4$ layer and YPO$_4$—ZrO$_2$ layers used therein. The delamination releases the stress which have accumulated and thereby prevents catastrophic cracking and failure. Those skilled in the art, using the teachings herein, would be able to apply these teachings to prepare similar laminates having similar high-strength and damage-tolerant properties, for example, by replacing yttria phosphate with another appropriate metal phosphate having a xenotime or monazite structure, or an oxide.

We claim:

1. A multilayer ceramic composite comprising a metal phosphate layer, a first yttria stabilized zirconia layer, a yttria stabilized zirconia-alumina layer and a second yttria stabilized zirconia layer; wherein the yttria stabilized zirconia-alumina layer comprises 10–40 vol % yttria stabilized zirconia and about 90–60 vol % alumina; and said yttria stabilized zirconia contains 1–5 mol % yttria.

2. The multilayer ceramic composite according to claim 1, wherein said layers are repeated a plurality of times in sequence.

3. The multilayer ceramic composite according to claim 1, wherein said metal phosphate is selected from the group consisting of monazites, xenotimes, calcium phosphate, aluminum phosphate, zirconium phosphate, and substituted zirconium phosphate wherein Zr$^{4+}$ is partially replaced by divalent metal ions.

4. The multilayer ceramic composite according to claim 3 wherein the divalent metal ions are Ca$^{2+}$ and Sr$^{2+}$.

5. The multilayer ceramic composite according to claim 1, wherein reinforcing particulates, whiskers or fibers are incorporated into the yttria stabilized zirconia layers, the yttria stabilized zirconia-alumina layers and the metal phosphate layers.

6. The multilayer ceramic composite according to claim 5, wherein the reinforcing material is selected from the group consisting of $Al_2O_3$, $Y_3Al_5O_{12}$, $BeAl_2O_4 MgAl_2O_4$, $ZrO_2$, SiC, BN, SiN, mullite, cordierite, and mixtures of the same.

7. The multilayer ceramic composite according to claim 1, wherein reinforcing particulates, whiskers or fibers are incorporated into the yttria stabilized zirconia layers, the yttria stabilized zirconia-alumina layers and the metal phosphate layers.

8. The multilayer ceramic composite according to claim 7, wherein the reinforcing material is selected from the group consisting of $Al_2O_3$, $Y_3Al_5O_{12}$, $MgAl_2O_4$, $ZrO_2$, SiC, BN,, SiN, mullite, cordierite and mixtures of the same.

9. The multilayer ceramic composite according to claim 1, wherein the thickness of each of the metal phosphate layer, the first and second yttria stabilized zirconia layers and the yttria stabilized zirconia-alumina layer is in the range 1–500 microns.

* * * * *